Sept. 26, 1944.     R. W. DE LANCEY     2,359,024
FUEL CONTROL VALVE
Filed April 15, 1942
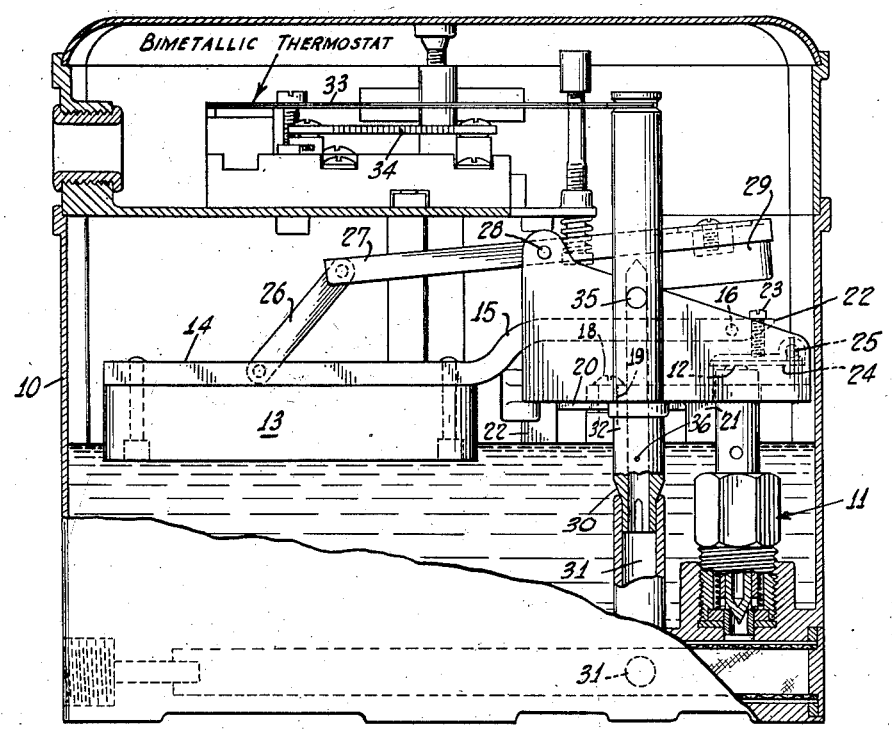
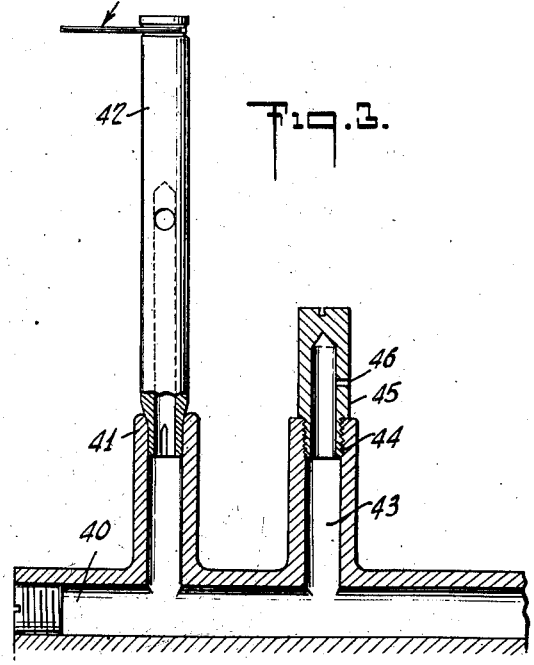
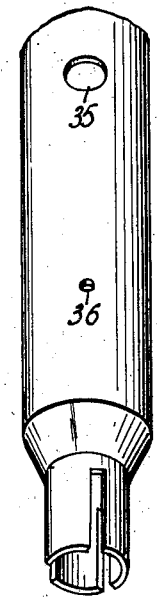
INVENTOR
RALPH W. DE LANCEY.
BY
ATTORNEY Patented Sept. 26, 1944

2,359,024

UNITED STATES PATENT OFFICE 2,359,024

FUEL CONTROL VALVE

Ralph W. De Lancey, Meriden, Conn., assignor to The Miller Company, a corporation of Connecticut Application April 15, 1942, Serial No. 439,017

1 Claim. (Cl. 137—68)

The present invention relates to fuel control valves, and is more particularly directed toward valves for controlling the flow of liquid fuel to burners of the type which employ a pilot flame.

It has heretofore been customary to supply a limited amount of fuel to support a pilot flame, this limited flow being regulated by moving nearly to the closed position the valve member which also controls the high fire. In some instances the control valves have been arranged so that the pilot valve is operated entirely independently of the main control valve stem. In all these cases, however, the liquid for the pilot valve has flowed through a valve opening which was submerged a substantial distance below the liquid level in the constant level valve.

It is important that excess fuel should not be burned to maintain a pilot, for such excess fuel is not only wasteful of the fuel, but may result in heating the furnace unnecessarily and in the more rapid formation of carbon which tends to put out or extinguish the pilot flame. The amount of fuel furnished the pilot must not be below an amount sufficient to maintain combustion, otherwise the pilot goes out. It is thus apparent that for satisfactory pilot operation a rather critical flow rate is necessary. When an attempt is made to control the flow of this amount of fuel through a hole or opening at or adjacent the valve seat, as is usual in this art, experience has shown that pilot operation was likely to become impaired by reason of clogging of the very small opening necessary for the limited flow of fuel. When the pilot goes out the burner stops operation and must be serviced before it can be restored to operation.

According to the present invention the fuel required for pilot operation is permitted to flow through a passage of fixed unvarying limiting dimension, in a predetermined and preferably unvarying position relative to the surface of the liquid in the constant level valve. This makes it possible to avoid all irregularities arising from movement of parts. Furthermore, according to the present invention the metering opening for the fuel is placed just below the surface of the liquid in the constant level valve so that it is always submerged, and this hole can therefore be made a great deal larger than the hole of equivalent flow rate submerged a substantial distance below the surface of the liquid.

The accompanying drawing shows, for purposes of illustrating the present invention, two embodiments in which the invention may take form, it being understood that the drawings are illustrative of the invention rather than limiting the same.

In the drawing:

Figure 1 is a vertical sectional view through a combined constant level and metering structure, and wherein the metering valve is provided with the control for low or pilot flame;

Figure 2 is a perspective view of the valve stem of Figure 1 at an enlarged scale; and Figure 3 is a fragmentary sectional view illustrating a modified form of construction.

The present invention may be used with any form of constant level valve construction. In the form shown in Figure 1 the valve has a reservoir 10, inlet valve mechanism, indicated generally at 11, which is under the control of a plunger 12 adapted to press down on the inlet valve stem to close the same.

A liquid displacement element 13 made of a light weight alloy, such as aluminum and magnesium, or a plastic block, is secured to the long arm 14 of a lever 15 pivoted at 16 on a bridge 17 fixedly secured within the reservoir by screws 18 passed into lugs 19 formed in the reservoir walls, and aligned by lugs 20 entering between lugs 21 and 22 formed in the reservoir walls. The element 13 is so located that at the desired liquid level to be maintained it has a partial submersion volume V somewhat less than the total volume so that it is buoyed upwardly and has less apparent weight. The short arm 22 of the lever 15 carries an adjustable screw 23 adapted to engage a short lever 24 pivoted at 25 and resting on the plunger 12. The weight 13 is connected by a sloping link 26 with a lever 27 pivoted at 28 to the bridge and carrying an adjustable counterweight 29. The parts carried by the bridge may be assembled as a unit and secured in place.

The dimensions and mass distribution of the system are such that at a predetermined level of liquid the entire system is in balance and while the screw 23 is in contact with the lever 24 no pressure is exerted to close the valve. Any increase in liquid level will submerge more of weight 13 and increase its buoyancy so that it contributes less turning moment to the system, whereupon the counterweight predominates and pressure is applied by screw 23 on lever 24 to depress the plunger 12 of the valve.

The receptacle is provided with an outlet valve seat 30 which communicates through a passage 31 with the burner in the usual manner. The valve seat 30 cooperates with a valve stem 32 which is adapted to be moved from full closed position against the valve seat to full open position by any suitable means, for example, a bimetallic thermostat 33 under the influence of a remote control heater 34. A manually operated valve may be used if desired. The valve stem 32 is tubular and has a vent 35 above the level of the fuel as usual.

The valve stem 32 is provided with a small horizontal opening or drilling 36 placed at such an elevation relative to the valve seat as to be slightly below the level at which the constant level valve mechanism maintains the liquid. For example, the hole produced by a drill .026 inch in diameter and approximately $\frac{3}{32}$ of an inch below the oil level will provide a flow of 1.0 to 1.4 cubic centimeters per minute. Where higher pilot flow rates, such as 3½ to 11 cubic centimeters per minute are employed, the hole size and depth will be altered to supply the necessary flow. With an appropriate arrangement the flow rate may be kept within the critical flow rate for the burner to be supplied over very long periods.

It will be noted that this hole is in the region where the oil is least contaminated by dirt and foreign matter, the latter settling always to the bottom of the receptacle. There is therefore very little likelihood of any dirt entering the hole. The hole is very short and as it communicates with the vent passage there is no likelihood of an air bubble interfering with the flow of the oil.

With this form of construction the complete valve device is assembled, flow rated and adjusted at the factory. Exhaustive tests have shown that when these valves are employed with pot type burners requiring the lowest flow rate mentioned, pilot failure is reduced substantially to the vanishing point. It is impossible to tamper with the pilot flow rate and it is also impossible for the serviceman to alter the flow rate in the existing structure. Where it is necessary to obtain a different flow rate the valve stem must be completely removed and one with different sized opening or differently located opening substituted.

In the arrangement shown in Figure 3 the outlet passage 40 has a seat 41 cooperable with the valve stem 42 of usual construction and adapted to move from full open to full closed position to control the flow of fuel for high fire. A branch passage 43 extends upwardly to a threaded seat 44. A plug-like member 45 is adapted to be threaded into this seat. This plug-like member is tubular, as indicated, and has an opening 46 similar to and for the same purposes as the opening 36 in the valve stem. With this arrangement no change whatever is made in the structure of the valve for controlling high fire and the pilot control is through the independent communicating outlet having the metering opening. The member 45 may be extended above the oil level and vented, if desired, but this is not necessary as the usual vent provided in the valve stem 42 will suffice. In the event that it is desired to provide a device, such as shown in Figure 3 in which the flow rate can be varied, the parts can be threaded so as to permit adjustment of the elevation of the opening by threading or unthreading the member 45 as desired.

It is obvious that the invention may be embodied in many forms and constructions within the scope of the claim and I wish it to be understood that the particular forms shown are but a few of the many forms. Various modifications and changes being possible, I do not otherwise limit myself in any way with respect thereto.

What is claimed is:

Means for controlling the flow of liquid fuel for maintaining a pilot flame over an indefinite period, which comprises a liquid receptacle, means to maintain liquid at a constant level in the receptacle, and an outlet from the chamber including a very small horizontal hole of the order of .026 inch in diameter submerged a distance below the surface of the liquid in the order of $\frac{3}{32}$ of an inch so as to be under a small, but constant, hydrostatic head to maintain a uniform flow rate.

RALPH W. DE LANCEY.